United States Patent
Sayres (10) Patent No.: US 7,615,710 B2
(45) Date of Patent: Nov. 10, 2009

(54) HINGE FOR CABLE TROUGH COVER

(75) Inventor: Derek Sayres, Lonsdale, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/184,327

(22) Filed: Aug. 1, 2008

(65) Prior Publication Data

US 2009/0032651 A1    Feb. 5, 2009

Related U.S. Application Data (60) Provisional application No. 60/953,368, filed on Aug. 1, 2007.

(51) Int. Cl.
*H02G 3/04*    (2006.01)

(52) U.S. Cl. .............. 174/480; 174/481; 174/68.1; 174/72 A; 52/220.1; 439/207; 385/134

(58) Field of Classification Search .............. 174/480, 174/481, 68.1, 68.3, 72 A, 72 C, 95–98; 52/220.1, 52/220.5, 220.7; 385/100, 134–135; 439/207; 248/68.1; 16/149
See application file for complete search history.

(56) References Cited

U.S. PATENT DOCUMENTS

| | | | |
|---|---|---|---|
| 3,786,171 A | | 1/1974 | Shira |
| 4,017,137 A | * | 4/1977 | Parks .......................... 439/135 |
| D269,968 S | | 8/1983 | Moura |
| 4,406,379 A | | 9/1983 | Anderson et al. |
| 4,423,284 A | | 12/1983 | Kaplan |
| 4,634,019 A | | 1/1987 | Pherigo |
| 4,640,314 A | | 2/1987 | Mock |
| 4,942,271 A | | 7/1990 | Corsi et al. |
| 5,004,192 A | | 4/1991 | Handler |

(Continued)

FOREIGN PATENT DOCUMENTS

EP    1 033 800 A1    9/2000

(Continued)

OTHER PUBLICATIONS

"FiberGuide® System Installation Manual," *ADC Telecommunications, Inc.*, ADCP-95-005, Issue 1, front cover, pp. i-viii, pp. 5-2 to 5-15, and back cover (Sep. 2002).

(Continued)

*Primary Examiner*—Dhiru R Patel
(74) *Attorney, Agent, or Firm*—Merchant & Gould P.C.

(57) ABSTRACT

A cover for a cable trough system includes a main body that defines a planar surface with a first end and a second end, and a first hinge arrangement at the first end of the main body. The first hinge arrangement includes a planar member that extends from the first end, the planar member including a planar detent, an intermediate member that extends from the planar member, the intermediate member including a first arm with a first intermediate detent and a second arm with a second intermediate detent, and a distal member that extends from a distal end of the planar member, the distal member including a distal detent. The planar member, the intermediate member, and the distal member together define a space sized to receive a portion of a wall of a trough member.

20 Claims, 5 Drawing Sheets

U.S. PATENT DOCUMENTS

| | | | |
|---|---|---|---|
| 5,134,250 | A | 7/1992 | Caveney et al. |
| 5,235,136 | A | 8/1993 | Santucci et al. |
| 5,614,695 | A * | 3/1997 | Benito Navazo ............ 174/480 |
| 5,669,106 | A | 9/1997 | Daoud |
| 5,728,976 | A | 3/1998 | Santucci et al. |
| 5,942,729 | A | 8/1999 | Carlson, Jr. et al. |
| 5,957,414 | A * | 9/1999 | Perrignon de Troyes et al. . 248/27.1 |
| 6,084,180 | A | 7/2000 | DeBartolo, Jr. et al. |
| 6,107,575 | A | 8/2000 | Miranda |
| 6,107,576 | A | 8/2000 | Morton et al. |
| 6,288,331 | B1 | 9/2001 | Wirthwein et al. |
| 6,323,421 | B1 | 11/2001 | Pawson et al. |
| 6,333,461 | B1 | 12/2001 | Marcou et al. |
| 6,348,660 | B1 | 2/2002 | Gutgsell et al. |
| 6,380,484 | B1 | 4/2002 | Theis et al. |
| 6,437,243 | B1 | 8/2002 | VanderVelde et al. |
| 6,437,244 | B1 | 8/2002 | Vander Velde |
| 6,437,247 | B1 * | 8/2002 | Holliday .................... 174/101 |
| 6,459,038 | B1 | 10/2002 | Waszak et al. |
| 6,476,327 | B1 | 11/2002 | Bernard et al. |
| D473,850 | S | 4/2003 | Rouleau et al. |
| 6,664,467 | B1 * | 12/2003 | de la Borbolla ............ 174/503 |
| 6,668,123 | B1 | 12/2003 | Ellison et al. |
| 6,677,533 | B2 | 1/2004 | Bernard et al. |
| 6,693,238 | B2 | 2/2004 | Jadaud et al. |
| 6,792,877 | B2 | 9/2004 | Gutgsell et al. |
| 6,803,519 | B2 | 10/2004 | de la Borbolla et al. |
| 6,810,191 | B2 | 10/2004 | Ferris et al. |
| 6,835,891 | B1 | 12/2004 | Herzog et al. |
| RE38,709 | E | 3/2005 | Gutgsell et al |
| 6,903,265 | B1 | 6/2005 | VanderVelde et al. |
| 6,916,986 | B1 | 7/2005 | Herzog et al. |
| 6,972,367 | B2 | 12/2005 | Federspiel et al. |
| 7,041,897 | B2 | 5/2006 | Herzog |
| 7,041,912 | B2 | 5/2006 | Kadrnoska et al. |
| 7,060,901 | B2 | 6/2006 | Herzog et al. |
| 7,326,863 | B2 | 2/2008 | Herzog |
| 7,411,126 | B2 | 8/2008 | Herzog et al. |
| 2002/0050374 | A1 | 5/2002 | Vander Velde |
| 2003/0016931 | A1 | 1/2003 | Ferris et al. |
| 2003/0047345 | A1 | 3/2003 | Bernard et al. |
| 2003/0089515 | A1 | 5/2003 | Federspiel et al. |
| 2004/0218884 | A1 | 11/2004 | Ferris et al. |

FOREIGN PATENT DOCUMENTS

| | | |
|---|---|---|
| EP | 1 284 535 A1 | 2/2003 |
| EP | 1 317 040 A1 | 6/2003 |
| EP | 1 601 075 A2 | 11/2005 |
| FR | 2 406 327 | 5/1979 |
| FR | 2 425 518 | 12/1979 |
| GB | 1021871 | 3/1966 |
| WO | WO 95/28757 | 10/1995 |
| WO | WO 02/18992 A1 | 3/2002 |
| WO | WO 02/29463 A1 | 4/2002 |

OTHER PUBLICATIONS

"FibreGuide® Fiber Management Systems," *ADC Telecommunications, Inc.*, 1st Edition, front cover, pp. 20, 26, 32, and back cover (Mar. 2002).

"Lightpaths, Fibre Optic Management Systems," *Warren & Brown & Staff*, Issue 2, 11 pages (1995).

* cited by examiner

HINGE FOR CABLE TROUGH COVER

RELATED APPLICATION

This application claims the benefit of U.S. patent application Ser. No. 60/953,368 filed on Aug. 1, 2007, the entirety of which is hereby incorporated by reference.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; and 5,752,781 teach cable routing systems that include a plurality of trough members and couplers.

Various concerns arise in the use of trough members. One concern is that trough members are typically U-shaped and therefore have open ends through which debris and other undesirable material, such as tools, hardware, and other debris, can fall onto the fibers running through the trough members. In addition, the open ends can allow fiber to potentially escape from the trough members. Further, even if the trough members include covers to close the open ends, it may be necessary to periodically gain access to the interior portions of the trough members to, for example, add or remove fibers.

It is therefore desirable to provide covers for trough members that reduce debris from entering interior portions of the trough members while still allowing for access to the interior portions of the trough members.

SUMMARY

Embodiments of the present invention are directed to systems and methods for the management and routing of telecommunication cables and, more particularly, to covers for cable trough members. Generally, the covers can be coupled to the trough members to cover the trough members. In addition, the covers can be pivoted with respect to the trough members to provide access to the interior portions of the trough members.

The above summary is not intended to describe each disclosed embodiment or every implementation. The figures and the detailed description that follow more particularly exemplify example embodiments. While certain embodiments will be illustrated and described, the disclosure is not limited to use in such embodiments.

DETAILED DESCRIPTION

Embodiments disclosed herein are directed to covers for cable trough members. Generally, the covers can be coupled to the trough members to cover the trough members. In addition, the covers can be pivoted with respect to the trough members to provide access to the interior portions of the trough members. As used herein, the term trough member is used to refer to any trough, fitting, railway, raceway, or similarly configured component including any number of ends. In example embodiments, the trough members can be positioned to extend vertically or horizontally.

Figure 1:
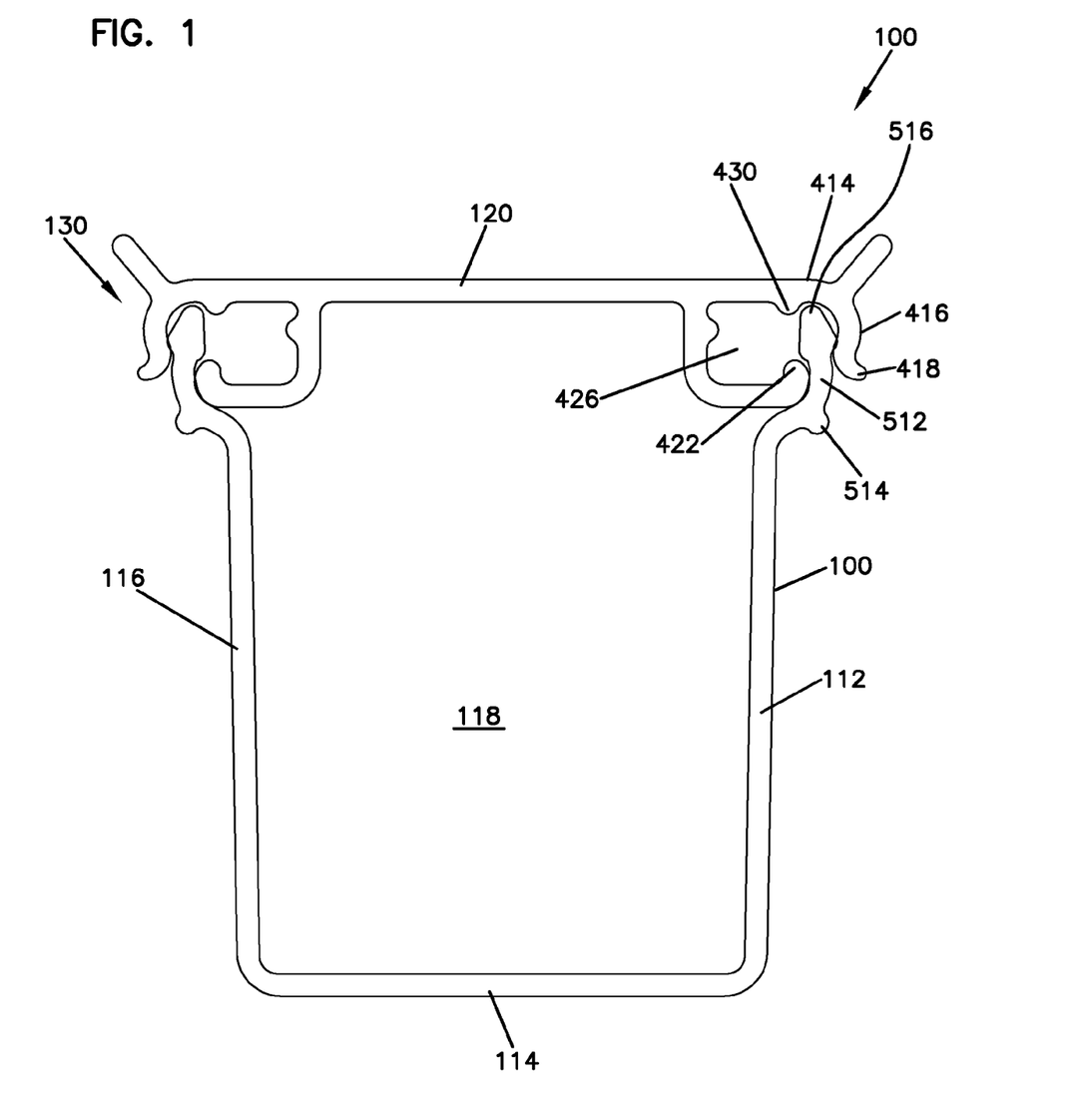
FIG. 1 is a side view of an embodiment of a trough system with a cover in a closed position.
Figure 2:
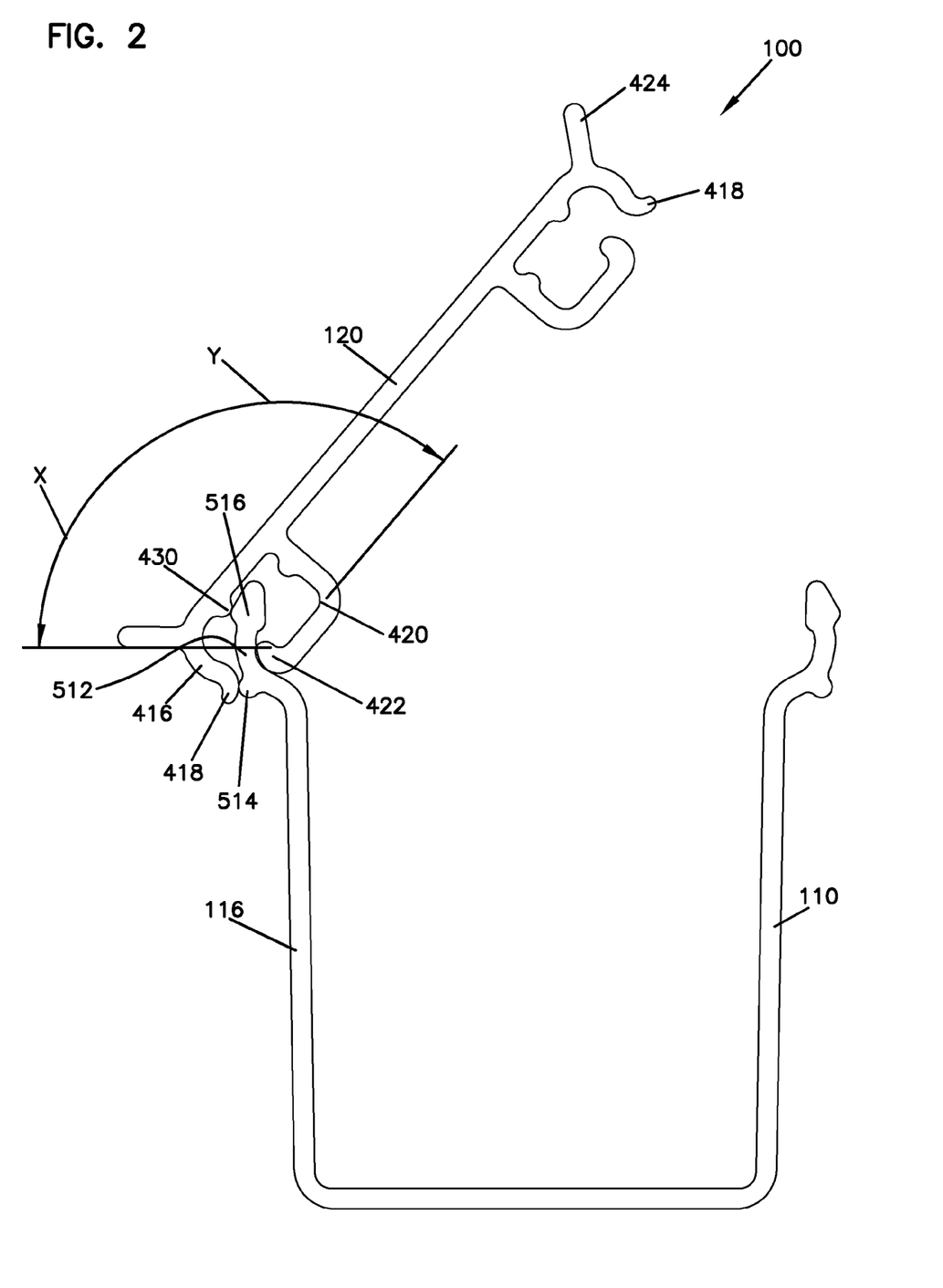
FIG. 2 is a side view of the trough system of FIG. 1 with the cover in a partially opened position.
Figure 3:
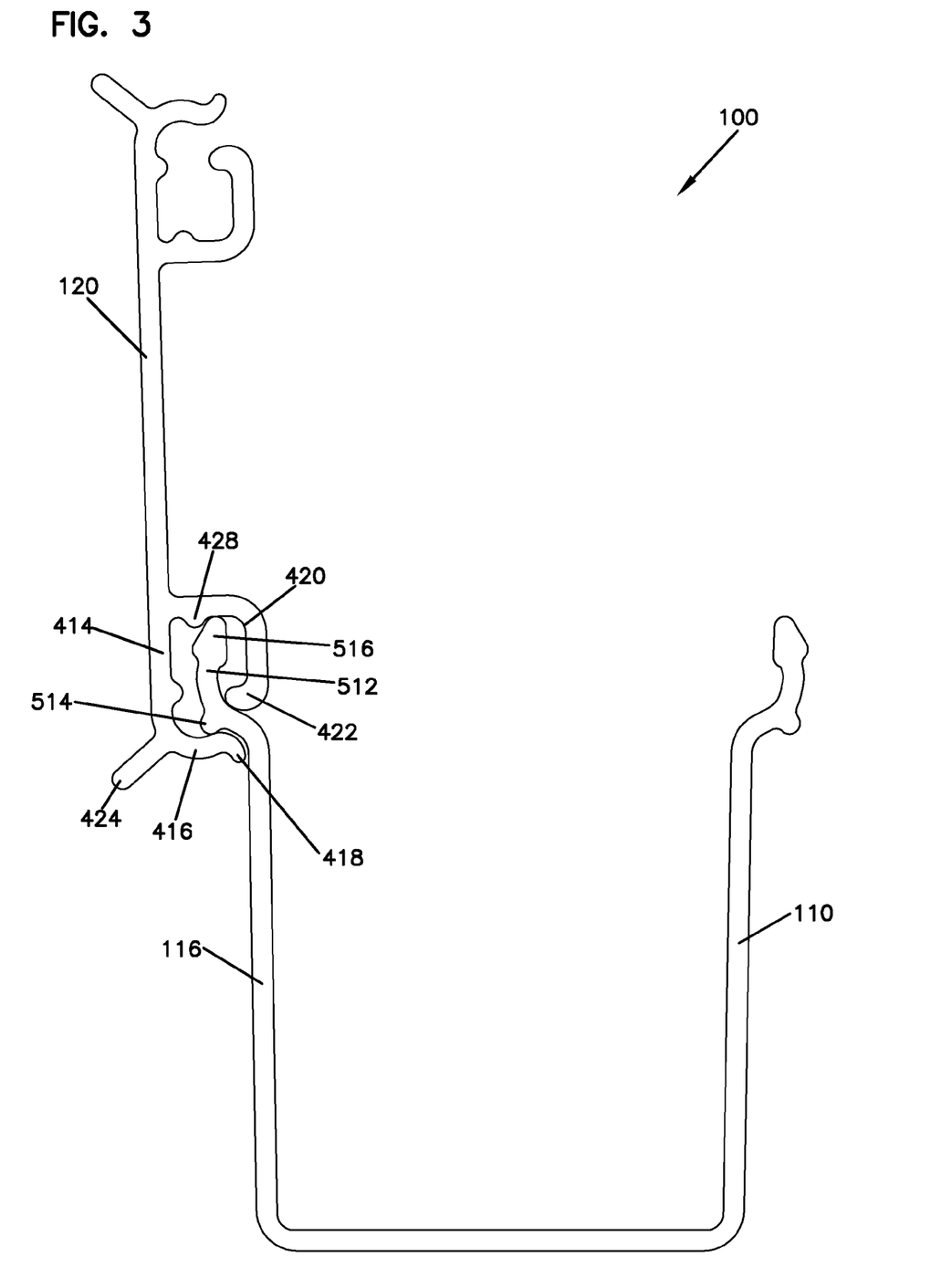
FIG. 3 is a side view of the trough system of FIG. 1 with the cover in an open position.

Referring now to FIGS. 1-3, an example embodiment of a cable trough system 100 is shown. The system 100 generally includes a trough member 110 and a cover 120. In example embodiments, the cover 120 can be coupled to the trough member 110 by a hinge arrangement 130, and the cover 120 can pivot relative to trough member 110 between closed and open positions, as shown in FIGS. 1-3.

The example trough member 110 includes first and second sidewalls 112 and 116 coupled to a third sidewall 114 generally forming a U-shaped trough with an interior space 118 through which cables such as fiber (not shown) can be run. The trough member 110 extends lengthwise in a vertical or horizontal direction when in use. The trough member 110 can be of varying lengths and widths, and can be coupled to other trough members or similar structures to form a cable trough system. In example embodiments, the first and second sidewalls 112, 116 can be solid, or can define a plurality of slots through which cables can enter and exit the interior space of the trough member 110.

Figure 5:
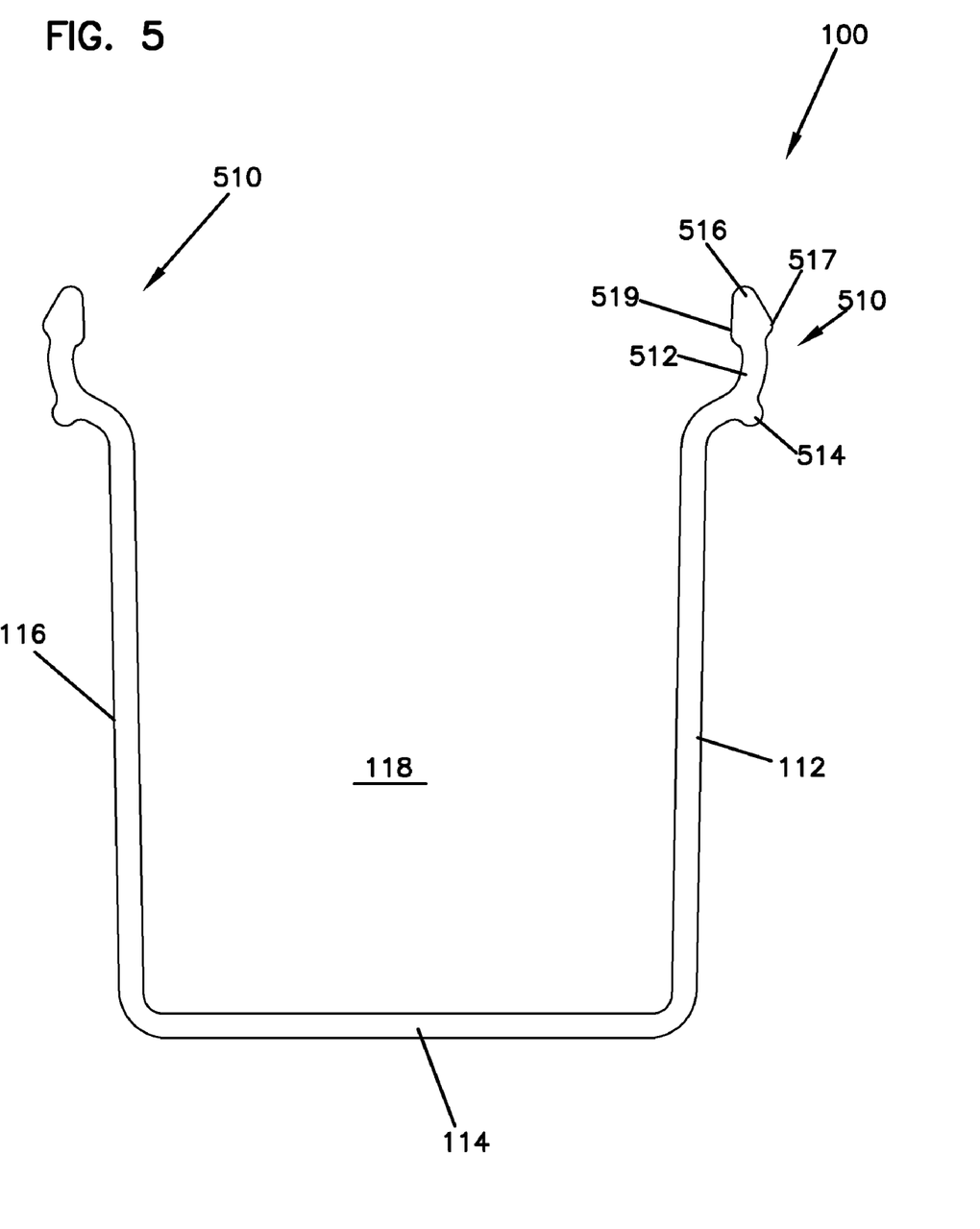
FIG. 5 is a side view of a trough of the trough system of FIG. 1.

Referring now to FIG. 5, each of the free ends of the sidewalls 112, 116 includes a first hinge portion 510 that is part of the hinge arrangement 130. In example embodiments, the first hinge portions 510 allow the cover 120 to be coupled to and pivot about one or both of the first hinge portions 510, as described further below. Each first hinge portion 510 includes a curved main body 512 that extends in a generally concave manner with respect to the interior space 118 of the trough member 110. A detent protrusion 514 extends outwardly from the main body 512 of the first hinge portion 510. In addition, an enlarged end portion 516 extends from the main body 512. The enlarged end portion 516 forms two detent portions 517, 519, one exterior and one interior.

Figure 4:
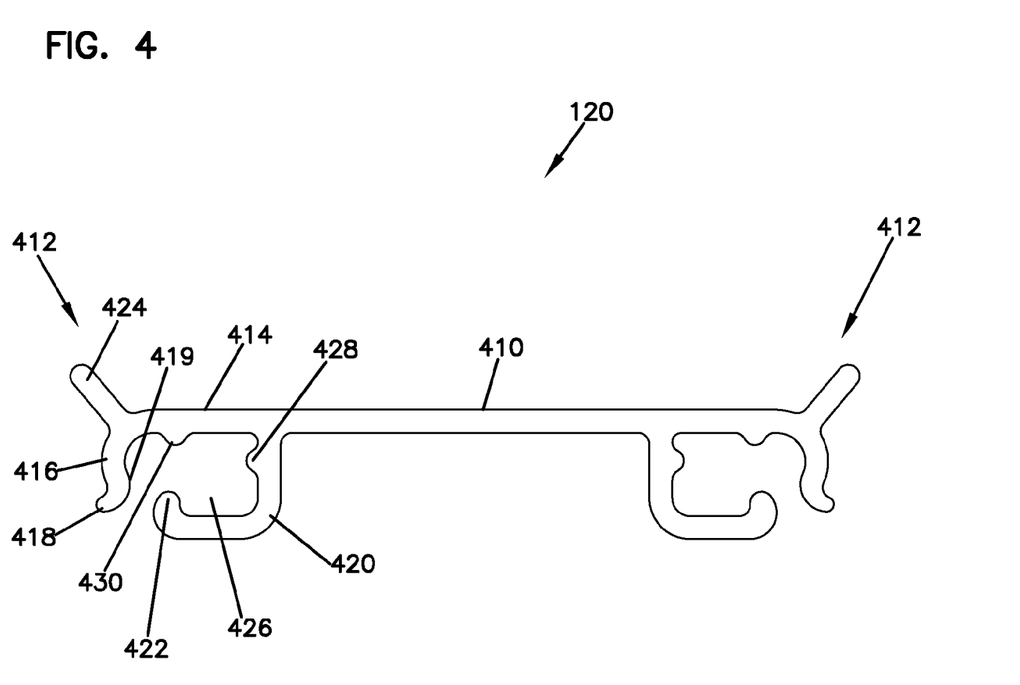
FIG. 4 is a side view of a cover of the trough system of FIG. 1.

Referring now to FIG. 4, the example cover 120 is shown in more detail. The cover 120 includes a planar main body 410. Attached at opposite ends of the main body 410 are second hinge portions 412 that form part of the hinge arrangement 130 and that are configured to be coupled to and pivot about the first hinge portions 510 of the trough 110, as described further below.

In example embodiments, the cover 120 extends from the first sidewall 112 to the second sidewall 116 to cover the open end of the trough member 110. Depending on the width of the trough member 110, a width of the cover 120 can be sized to cover the open end. In example embodiments, the width of the cover 120 is 4, 6, or 12 inches, depending on the width of the trough member 110. The cover 120 extends lengthwise from a first end to a second end. In example embodiments, the length of the cover 120 (i.e., the distance between ends) is between 2 and 8 feet. In one embodiment, the length is approximately 6 feet. Successive covers 120 can be used end to end to cover trough members of longer length, and the cover 120 can be cut to other desired lengths. In alternative embodiments, the cover 120 can be sized to cover only one-half of the open end of the trough member. A separate cover 120 can be coupled to the opposite sidewall of the trough member 110 to cover the other half of the open end.

Each of the second hinge portions 412 includes a planar member 414, a distal member 416, and an intermediate arm 420. As shown, the member 416 includes a tapered end 418 with a convex detent protrusion 419, and the intermediate arm 420 includes a detent protrusion 422. An interior space 426 is formed between the member 416 and the intermediate arm 420. Detent protrusions 428, 430 extend from the intermediate arm 420 and the planar member 414 into the interior space 426. An extension 424 extends outwardly from the planar member 414 at an angle of approximately 45 degrees.

Referring now to FIGS. 1-3, the cover 120 can be coupled to the trough member 110 and can be moved from a closed position (FIG. 1) to an open position (FIG. 3). In the coupled state, the main body 512 of each first hinge portion 510 of the trough member 110 is positioned to extend within the interior space 426 of the second hinge portions 412 of the cover 120.

As shown in FIG. 1, the enlarged end portion 516 of the main body 512 is positioned between the detent protrusion 430 and the intermediate arm 420 of the cover 120. The detent protrusion 422 extends to engage the curved main body 512 and the enlarged end portion 516. In this closed position, the cover 120 extends over the open end of the trough member 110 and thereby protects any components (e.g., fiber cables) positioned in the interior space 118 of the trough member 110.

Referring now to FIG. 2, the cover 120 can be moved from the closed position to the open position. To accomplish this, one of the second hinge portions 412 of the cover 120 is uncoupled from the first hinge portion 510 of the trough member 110. The extension 424 and/or the tapered end 418 of the member 416 of one of the second hinge portions 412 can be forced away from the main body 512 until the tapered end 418 clears the enlarged end portion 516 and the second hinge portion 412 is uncoupled from the first hinge portion 510. At this point, the cover 120 can be rotated about the opposite first and second hinge portions 412, 510 in a direction X.

As the cover 120 is rotated in the direction X, the enlarged end portion 516 of the first hinge portion 510 that remains coupled to the second hinge portion 412 slides along the member 416 and over the detent protrusion 430 within the interior space 426. The detent protrusion 422 pivots about the main body 512 within the interior space 426, and the tapered end 418 slides along the outer surface of the main body 512.

Referring now to FIG. 3, the cover 120 is shown in the fully open position. In this position, the enlarged end portion 516 has slid over and engages the detent protrusion 428, and the tapered end 418 has slid over and engages the detent protrusion 514. The detent protrusion 422 continues to engage the main body 512. In this configuration, the cover 120 is held in the fully open position.

To close the cover 120, the cover 120 is pivoted in a direction Y opposite to that of the direction X until the main body 512 of the first hinge portion 510 is positioned to extend within the interior space 426 of the second hinge portion 412 of the cover 120, as shown in FIG. 1.

In one embodiment, the preferred rest position of the cover 120 is where the cover 120 is angled at about 15 degrees from the closed horizontal position. Therefore, if the cover 120 is not held, the cover 120 will not stay at various positions between the closed and open positions. Instead, the cover 120 will revert back to one preferred rest state at 15 degrees from closed. For example, if the cover 120 is rotated to the position shown in FIG. 2 and then the user lets go of the cover 120, the cover 120 will not remain in that position but will rotate back down to a rest position of 15 degrees from the fully closed position. When in the fully closed position shown in FIG. 1, the opposite latched end of the cover prevents the cover from pivoting into the partial open rest position. The preferred rest position at 15 degrees substantially covers the open side of the trough member 110 while at the same time allows cables to be added or removed from the trough. That the rest position of the cover trough substantially covers the open side of trough member 110 contributes to protecting fragile fiber cable inside the trough.

An example method of assembling the trough system 100 is as follows. Initially, the second hinge portions 412 of the cover 120 are positioned adjacent to the main body 512 of each of the first hinge portions 510 of the trough member 110. The cover 120 is then pressed towards the trough member so that the main bodies 512 enter the interior spaces of the 426 of the second hinge portions 412 until the enlarged end portions 516 of each of the main bodies 512 is fully seated within each respective second hinge portion 412, as shown in FIG. 1. Once the cover 120 is coupled to the trough member 110, the cover 120 can be pivoted between the closed and open positions as described above.

In example embodiments, the trough member 110 and the cover 120 are extruded from a synthetic thermoplastic polymer such as an acrylonitrile-butadiene-styrene (ABS)/polycarbonate blend. Other manufacturing methods (e.g., molding) and materials can also be used.

The various embodiments described above are provided by way of illustration only and should not be construed to limiting. Those skilled in the art will readily recognize various modifications and changes that may be made to the embodiments described above without departing from the true spirit and scope of the disclosure.

What is claimed is:

1. A cover for a cable trough system, the cover comprising:
a main body that defines a planar surface with a first end and a second end;
a first hinge arrangement at the first end of the main body, the first hinge arrangement including:
   a planar member that extends from the first end, the planar member including a planar detent;
   an intermediate member that extends from the planar member, the intermediate member including a first arm with a first intermediate detent and a second arm with a second intermediate detent; and
   a distal member that extends from a distal end of the planar member, the distal member including a distal detent;
   wherein the planar member, the intermediate member, and the distal member together define a space sized to receive a portion of a wall of a trough member;
   wherein, when the cover is in a closed position, the planar detent, the second intermediate detent, and the distal detent are position to engage an enlarged end portion of the wall of the trough member; and
   wherein, when the cover is in an open position, the first intermediate detent is positioned to engage the enlarged end portion of the wall; and
a second hinge arrangement at the second end of the main body.

2. The cover of claim 1, wherein the second hinge arrangement is an identical mirror image of the first hinge arrangement.

3. The cover of claim 1, wherein the first hinge arrangement further comprises an extension member that extends from the planar member at an angle.

4. The cover of claim 3, wherein the angle is about 45 degrees.

5. The cover of claim 1, wherein the first arm of the intermediate member and the distal member extend in a first direction generally parallel to one another, and the second arm of the intermediate member and the planar member extend in a second direction generally parallel to one another.

6. The cover of claim 5, wherein the first direction is generally perpendicular to the second direction.

7. The cover of claim 1, wherein the cover defines an intermediate resting position between the open and closed positions of about 15 degrees from the closed position.

8. The cover of claim 1, wherein, as the cover is pivoted about the first hinge arrangement from the closed position to the open position, the planar detent rides along the enlarged end portion of the wall until the planar detent clears the enlarged portion.

9. The cover of claim 1, further comprising:
   wherein the first arm of the intermediate member and the distal member extend in a first direction generally parallel to one another, and the second arm of the intermediate member and the planar member extend in a second direction generally parallel to one another; wherein, as the cover is pivoted about the first hinge arrangement from the closed position to the open position, the planar detent tides along the enlarged end portion of the wall until the planar detent clears the enlarged portion; and
   wherein the second hinge arrangement is an identical mirror image of the first hinge arrangement.

10. The cover of claim 9, wherein the first direction is generally perpendicular to the second direction.

11. A cable trough system, the system comprising:
   a trough member including a base wall and first and second sidewalls extending from the base wall to form a trough; and
   a cover including:
      a main body that defines a planar surface with a first end and a second end;
      a first hinge arrangement at the first end of the main body, the first hinge arrangement including:
         a planar member that extends from the first end, the planar member including a planar detent;
         an intermediate member that extends from the planar member, the intermediate member including a first arm with a first intermediate detent and a second arm with a second intermediate detent; and
         a distal member that extends from a distal end of the planar member, the distal member including a distal detent;
      wherein the planar member, the intermediate member, and the distal member together define a space sized to receive a portion of the first sidewall of a trough member;
      wherein, when the cover is in a closed position, the planar detent, the second intermediate detent, and the distal detent are position to engage an enlarged end portion of the first sidewall of the trough member; and
      wherein, when the cover is in an open position, the first intermediate detent is positioned to engage the enlarged end portion of the first sidewall; and
   a second hinge arrangement at the second end of the main body.

12. The system of claim 11, wherein the first sidewall includes a first hinge portion including:
   a main body that extends from the first sidewall; and
   the enlarged end portion that extends from the main body, the enlarged end portion forming outside and inside detents.

13. The system of claim 12, wherein the distal detent engages the outside detent of the enlarged end portion when the cover is in the closed position.

14. The system of claim 12, wherein the distal detent engages a main body detent formed by the main body of the first hinge portion of the first sidewall when the cover is in the open position.

15. The system of claim 12, wherein the second sidewall includes a second hinge portion that is an identical mirror image of the first hinge portion of the first sidewall.

16. The system of claim 11, wherein the first hinge arrangement further comprises an extension member that extends from the planar member an angle.

17. The system of claim 16, wherein the angle is about 45 degrees.

18. The system of claim 11, wherein the first arm of the intermediate member and the distal member extend in a first direction generally parallel to one another, and the second arm of the intermediate member and the planar member extend in a second direction generally parallel to one another.

19. The system of claim 18, wherein the first direction is generally perpendicular to the second direction.

20. The system of claim 11, wherein the cover defines an intermediate resting position between the open and closed positions of about 15 degrees from the closed position.

* * * * *

UNITED STATES PATENT AND TRADEMARK OFFICE
CERTIFICATE OF CORRECTION

| | |
|---|---|
| PATENT NO. | : 7,615,710 B2 |
| APPLICATION NO. | : 12/184327 |
| DATED | : November 10, 2009 |
| INVENTOR(S) | : Sayres |

Page 1 of 1

It is certified that error appears in the above-identified patent and that said Letters Patent is hereby corrected as shown below:

Title Page,
      Page 2, (56) References Cited, U.S. Patent Documents: insert --D430,543   9/2000   Rohder-- in appropriate order

Col. 4, line 61, claim 1: "are position to engage" should read --are positioned to engage--

Col. 6, line 12, claim 11: "are position to engage" should read --are positioned to engage--

Col. 6, line 38, claim 16: "member an angle." should read --member at an angle.--

Signed and Sealed this

Second Day of November, 2010

David J. Kappos
*Director of the United States Patent and Trademark Office*